(12) United States Patent
Lee

(10) Patent No.: US 11,779,841 B2
(45) Date of Patent: Oct. 10, 2023

(54) DEVICE AND METHOD FOR RENDERING VR CONTENT THAT PROVIDE BIRD'S EYE VIEW PERSPECTIVES

(71) Applicant: Newcore Corp., Seoul (KR)

(72) Inventor: Man Jae Lee, Seoul (KR)

(73) Assignee: Newcore Corp., Seoul (KR)

( * ) Notice: Subject to any disclaimer, the term of this patent is extended or adjusted under 35 U.S.C. 154(b) by 0 days.

(21) Appl. No.: 17/669,121

(22) Filed: Feb. 10, 2022

(65) Prior Publication Data

US 2022/0395750 A1    Dec. 15, 2022

(30) Foreign Application Priority Data

Jun. 9, 2021  (KR) .................. 10-2021-0074670

(51) Int. Cl.
| | | |
|---|---|---|
| *A63F 13/5255* | (2014.01) | |
| *A63F 13/65* | (2014.01) | |
| *A63F 13/212* | (2014.01) | |
| *A63F 13/54* | (2014.01) | |

(52) U.S. Cl.
CPC ........ *A63F 13/5255* (2014.09); *A63F 13/212* (2014.09); *A63F 13/54* (2014.09); *A63F 13/65* (2014.09); *A63F 2300/5553* (2013.01); *A63F 2300/8082* (2013.01)

(58) Field of Classification Search
CPC .... A63F 13/5255; A63F 13/65; A63F 13/843; A63F 2300/5553; A63F 2300/8082
See application file for complete search history.

(56) References Cited

U.S. PATENT DOCUMENTS

| | | | |
|---|---|---|---|
| 2011/0252341 A1 | 10/2011 | Leahy et al. | |
| 2017/0316639 A1* | 11/2017 | Lyons | G07F 17/3244 |
| 2019/0197820 A1* | 6/2019 | Caputo | G07F 17/323 |

FOREIGN PATENT DOCUMENTS

| | | |
|---|---|---|
| JP | 2018-007828 A | 1/2018 |
| JP | 2019-526103 A | 9/2019 |
| KR | 10-2011-0027272 A | 3/2011 |
| KR | 10-1599303 B1 | 3/2016 |
| KR | 10-1738870 B1 | 5/2017 |
| KR | 10-2018-0122869 A | 11/2018 |
| KR | 10-2020-0008706 A | 1/2020 |

OTHER PUBLICATIONS

An Office Action mailed by the Korean Intellectual Property Office dated Feb. 13, 2023, which corresponds to Korean Patent Application No. 10-2021-0074670 and is related to U.S. Appl. No. 17/669,121.
International Search Report issued in PCT/KR2022/006959; dated Aug. 12, 2022.

* cited by examiner

*Primary Examiner* — James S. McClellan
(74) *Attorney, Agent, or Firm* — Studebaker & Brackett PC

(57) ABSTRACT

The present disclosure relates to device and method for rendering VR content that provide bird's eye view perspectives, which can render a user's avatar and game content selected by the at least one user in a VR space, and provide a VR image like the avatar plays the game content, thereby providing an effect to play a game while viewing the game content from various points of view as well as a bird's eye view in the at least one user's perspective.

14 Claims, 7 Drawing Sheets

DEVICE AND METHOD FOR RENDERING VR CONTENT THAT PROVIDE BIRD'S EYE VIEW PERSPECTIVES

CROSS-REFERENCE TO RELATED APPLICATION

The present application is based upon and claims the benefit of priority to Korean Patent Application Nos. 10-2021-0074670, filed on Jun. 9, 2021. The disclosures of the above-listed applications are hereby incorporated by reference herein in their entirety.

BACKGROUND

1. Technical Field

The present disclosure relates to a system for rendering VR content, and more particularly, to a VR content rendering system providing modes from various perspectives.

2. Description of Related Art

Recently, various kinds of 3D VR contents and games have been developed. In the case that new 3D VR virtual games are created or existing 3D games are converted into 3D VR games, there is a problem in that user interfaces must be modified in consideration of various types of VR hardware.

Moreover, if the same interface as that of the existing game is applied to a VR machine as it is, it may cause 3D motion sickness symptoms due to discordance between visual information provided to a user and user motions.

Besides the above, even if a user continues to play a 3D VR game for a long time in a state in which a point of view is fixed in first-person, 3D motion sickness symptoms sometimes occur.

SUMMARY

The present disclosure has been made to solve the above-mentioned problems occurring in the prior art, and it is an object to provide a VR content rendering device which provides a bird's eye view perspective.

It is another object to provide VR images as an avatar plays a game by rendering a user's avatar in a VR space and with game content selected by at least one user.

It is a further object to provide a VR content rendering system capable of allowing a plurality of users to access a VR space and play a game together using their own avatars.

The objects of the present disclosure are not limited to those mentioned above, and other objects not mentioned herein will be clearly understood by those skilled in the art from the following description.

To accomplish the above objects, there is provided a VR content rendering device including: a database storing at least one avatar image and at least one background image to be output to a VR space; a communication unit communicating with a VR machine which at least one user wears; and a processor rendering the at least one user's avatar in the VR space so that the at least one user can control the avatar through the VR machine when the at least one user wearing the VR machine enters the VR space, renders game content selected by the at least one user in a specific position in the VR space and controls a VR image to be output to the VR machine, so that the at least one user can play the game through the avatar, wherein the processor, based on a structure and a background of the VR space and a position of the avatar, determines the specific position in which the game content is rendered in the VR space, and renders the game content in the VR image so as to be output at an angle at which the avatar views the game content.

In this instance, if a plurality of users play the game together, the processor renders the VR image by the plurality of users so that perspectives of the game content viewed through the at least one user's avatars are viewed according to the at least one user's perspective settings.

Moreover, the processor renders at least one rendering space for rendering the game content in a specific position, renders the game content in at least a part of an area in the rendering space, partitions the rendering space into a plurality of spaces if a plurality of different game contents are selected by the at least one user, and renders the selected different game contents in the plurality of partitioned spaces.

Furthermore, the processor determines a size and a rendering position of the rendering space, on the basis of the number of the at least one user entering the VR space and the number of game contents selected by the at least one user entering the VR space, and the processor determines a shape of the rendering space, on the basis of game environment information of the game content selected by the at least one user.

Additionally, the plurality of game contents include first game content and second game content, and the processor supports such that the at least one user can view the second game content while interacting with the first game content. In the situation in which the at least one user participates in the first game content and the second game content at the same time, if the first game content is a turn-based game and the avatar's perspective at the at least one user's turn is in the direction of the second game content, the processor performs conditions set by the first user. The conditions include a first condition to forcibly convert the avatar's perspective to the first game content, a second condition to convert a turn alarm object to the second game content, and a third condition to provide a sound alarm to the VR machine.

Moreover, the database stores an image of a game control means specific to at least one game content. The processor loads an image of the game control means, specific to the game content selected by the at least one user, from the database. The processor renders a state in which the avatar controls the loaded game control means to the VR space, and the processor renders the avatar's control motions according to commands input by the at least one user through the VR machine.

Furthermore, the processor renders the background image selected by the at least one user as a background of the VR space when receiving a request for rendering the background image from the at least one user entering the VR space.

Additionally, the processor collects state information of a character in the game content, selected by the at least one user entering the VR space, in real time. If the processor detects a change above a reference value from the state information, based on the detection result, the processor renders special effects matching the detection result in at least a part of an area in the VR space.

In another aspect of the present disclosure, there is provided a VR content rendering method carried out by a VR content rendering device, the VR content rendering method comprising the operations of: rendering an avatar in a VR space so that a user can control the at least one user's avatar through a VR machine when at least one user wearing the VR machine enters the VR space; rendering game content selected by the at least one user in a specific position in the VR space; and outputting a VR image to the VR machine so that the at least one user can play the game through the avatar, wherein the specific position is determined on the basis of structure and background of the VR space, and a position of the avatar, and the game content is rendered to be output at an angle that the avatar views the game content.

DETAILED DESCRIPTION

Advantages and features of the present disclosure and methods accomplishing the advantages and features will become apparent from the following detailed description of exemplary embodiments with reference to the accompanying drawings. However, the present disclosure is not limited to exemplary embodiment disclosed herein but will be implemented in various forms. The exemplary embodiments are provided so that the present disclosure is completely disclosed, and a person of ordinary skilled in the art can fully understand the scope of the present disclosure. Therefore, the present disclosure will be defined only by the scope of the appended claims.

Terms used in the specification are used to describe specific embodiments of the present disclosure and are not intended to limit the scope of the present disclosure. In the specification, the terms of a singular form may include plural forms unless otherwise specified. It should be also understood that the terms of 'include' or 'have' in the specification are used to mean that there is no intent to exclude existence or addition of other components besides components described in the specification. In the detailed description, the same reference numbers of the drawings refer to the same or equivalent parts of the present disclosure, and the term "and/or" is understood to include a combination of one or more of components described above. It will be understood that terms, such as "first" or "second" may be used in the specification to describe various components but are not restricted to the above terms. The terms may be used to discriminate one component from another component. Therefore, of course, the first component may be named as the second component within the scope of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Conventionally, friends or people played games together in a meeting space, a game room, a PC room, or the like. However, if each of the people plays game online using their own VR machine at home, they cannot feel like they are together.

Through the present disclosure, the inventor tries to provide users with the feeling like the users play a game together even though they individually access the game through their own VR machine at home, and also provide various points of view, such as a bird's eye view.

Hereinafter, preferred embodiments of the present disclosure will be described in detail with reference to the accompanying drawings.

Figure 1:
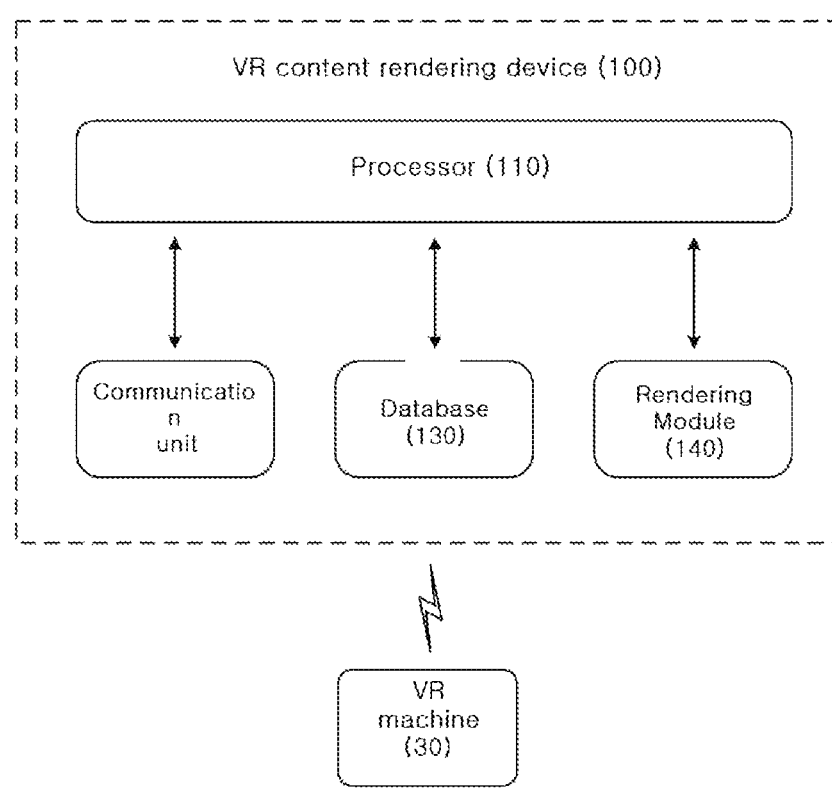
FIG. 1 is a block diagram of a VR content rendering system according to an embodiment of the present disclosure.

FIG. 1 is a block diagram of a VR content rendering system according to an embodiment of the present disclosure.

Figure 2:
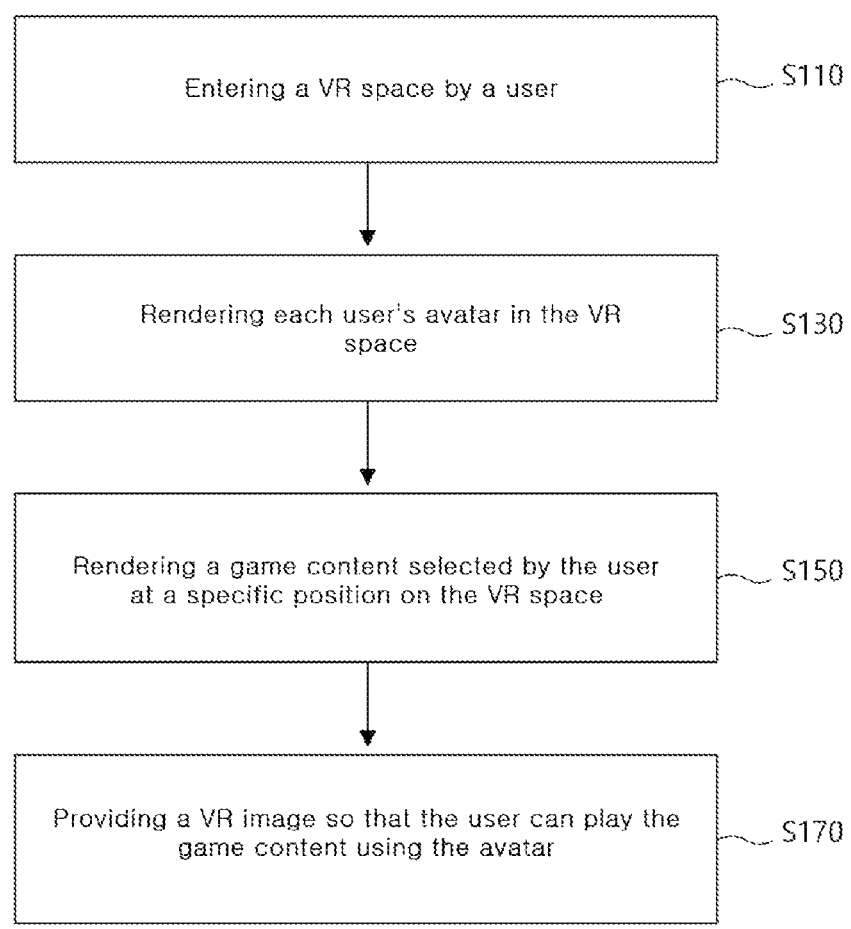
FIG. 2 is a flow chart of a VR content rendering method according to an embodiment of the present disclosure.

FIG. 2 is a flow chart of a VR content rendering method according to an embodiment of the present disclosure.

Figure 3:
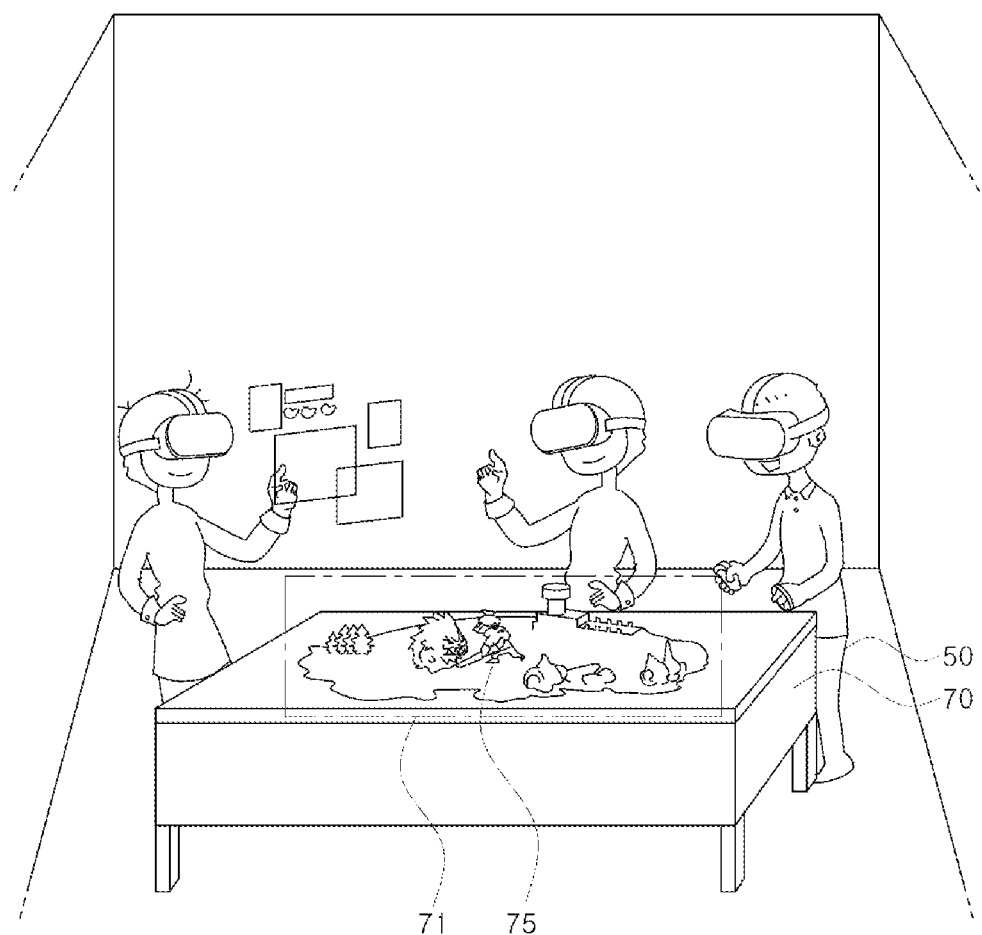
FIG. 3 is a view illustrating a VR image provided by the VR content rendering device according to the embodiment of the present disclosure.

FIG. 3 is a view illustrating a VR image provided by the VR content rendering device according to the embodiment of the present disclosure.

Figure 4:
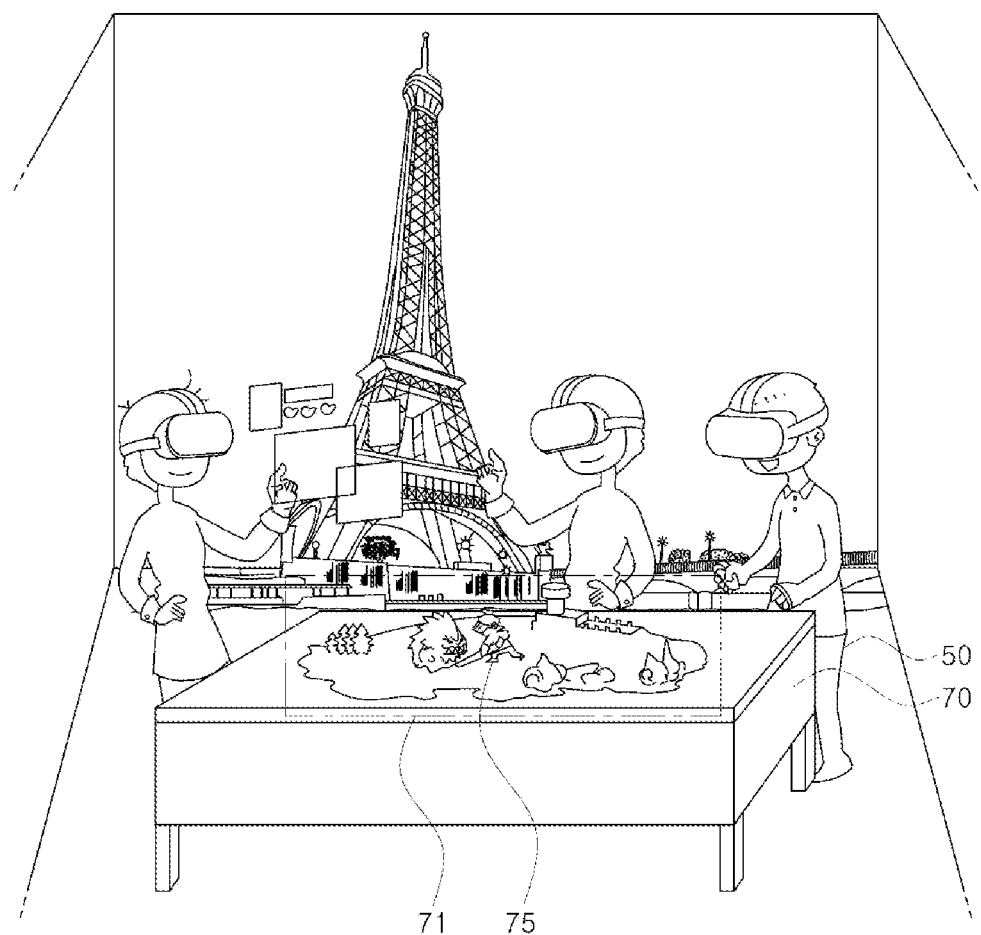
FIGS. 4 to 6 are views illustrating a state in which a customized background is rendered in a VR space of FIG. 3 in consideration of various conditions.
Figure 5:
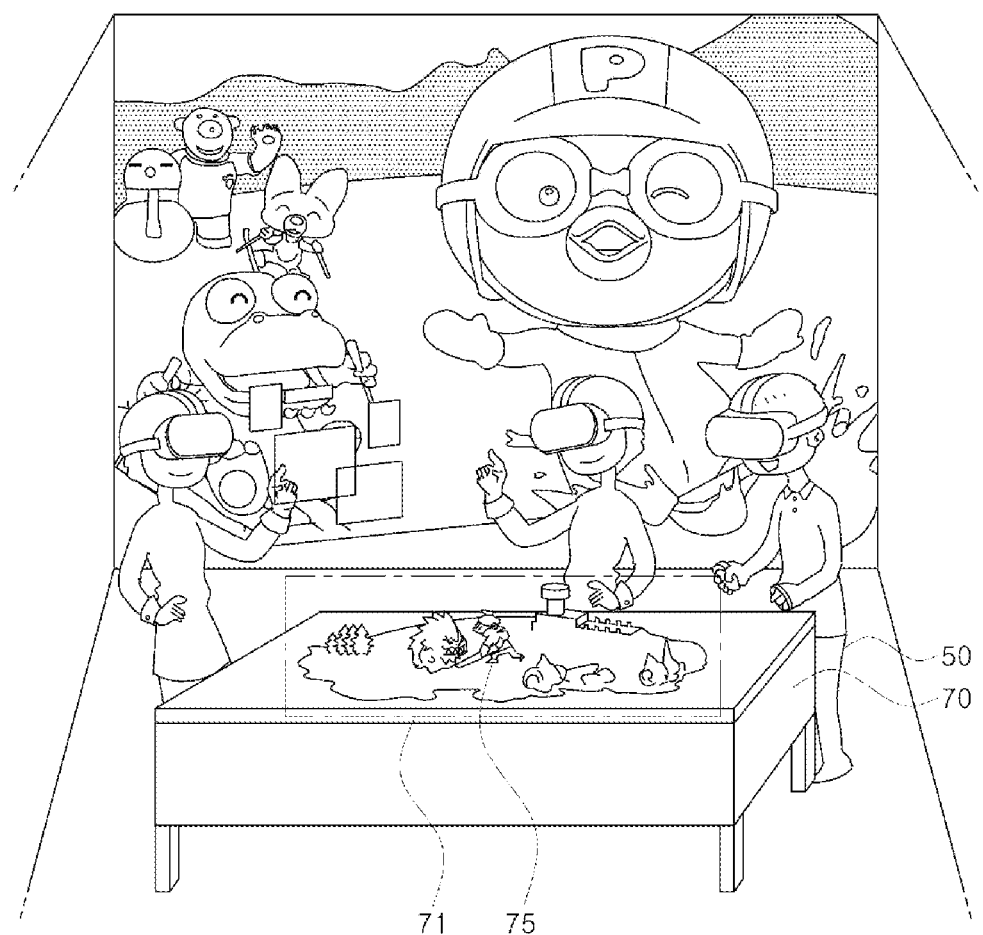
Figure 6:
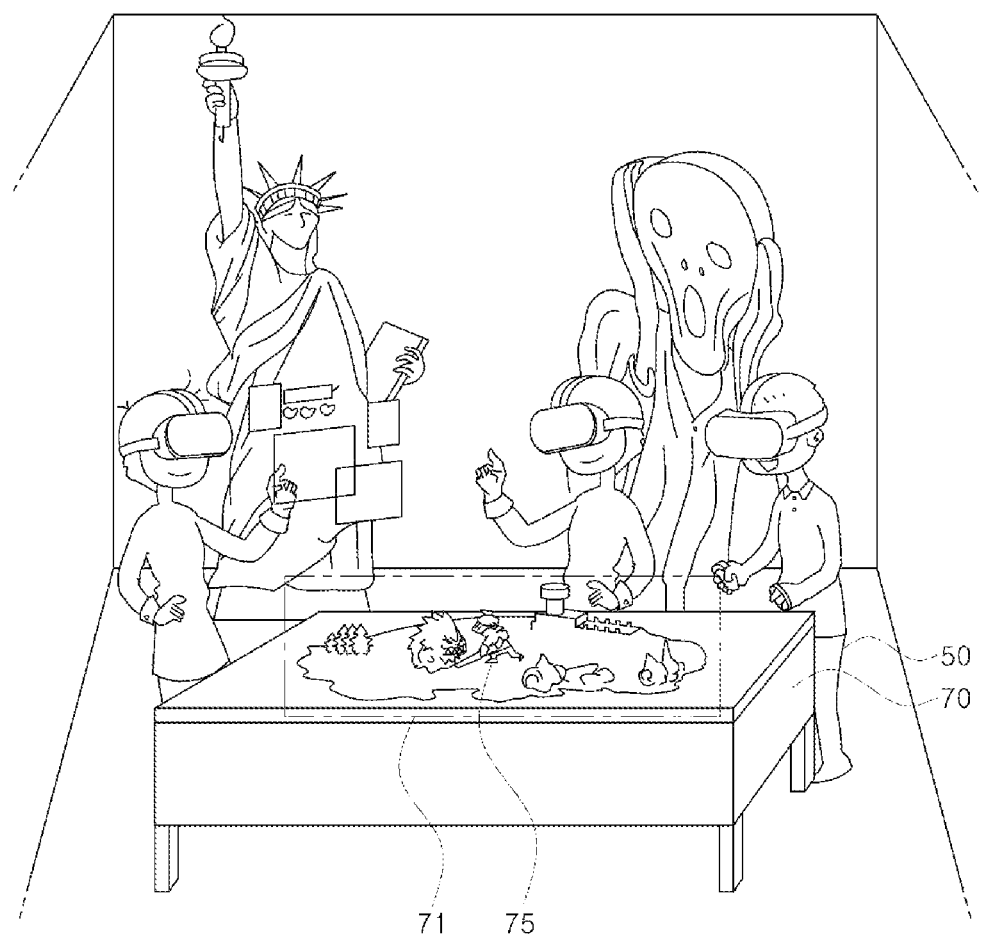

FIGS. 4 to 6 are views illustrating a state in which a customized background is rendered in a VR space of FIG. 3 in consideration of various conditions.

Figure 7:
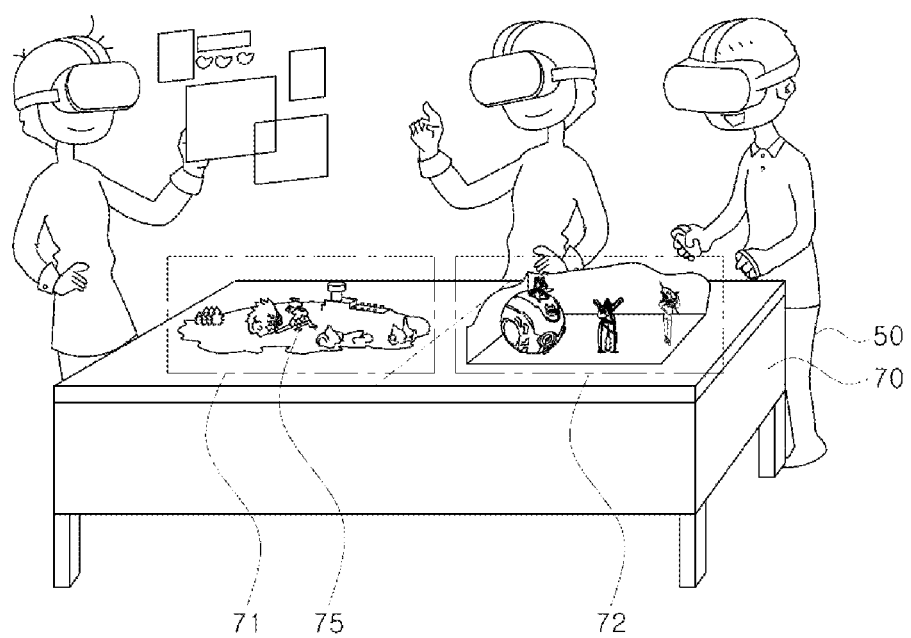
FIG. 7 is a view illustrating a state in which various game contents are played at the same time.

FIG. 7 is a view illustrating a state in which various game contents are played at the same time.

Referring to FIG. 1, the VR content rendering system 10 according to the embodiment of the present disclosure includes a VR content rendering device 100, and a VR machine 30.

The VR content rendering device 100 according to the embodiment of the present disclosure includes a processor 110, a communication unit 120, a database 130, and a rendering module 140.

However, in several embodiments, the system 10 and the device 100 may include components fewer or more than the components illustrated in FIG. 1.

The VR content rendering device 100 according to the embodiment of the present disclosure can be operated through a VR content rendering server, and various means, such as a computer and an information processor, can be applied to the VR content rendering device 100.

A database 130 stores various commands and algorithms for carrying out a VR content rendering method according to an embodiment of the present disclosure.

The database 130 has at least one avatar image to be output to VR space, and at least one background image to be output onto the VR space.

A communication unit 120 communicates with a VR machine 30 which at least one user wears.

In detail, the communication unit 120 receives a control signal corresponding to a command from the VR machine 30 of the at least one user entering the VR space, and transfers a VR image rendered through a rendering module 140 to the VR machine 30 so that the at least one user can watch the VR image.

The rendering module 140 renders the VR image according to a control of a processor 110, and in detail, renders an avatar image, a background image, game content, and so on in the VR image.

In this instance, the processor 110 loads the avatar image and the background image from the database 130, and renders the user's avatar image and background image in the VR image using the rendering module 140. However, the processor 110 can render the loaded image as it is, or can perform rendering by editing an additional image.

For instance, the avatar image can be customized as a user wants, or a user-customized avatar can be provided in consideration of user information stored in the server, the kind of the game content selected by the user, information on other players who play a game together with the user, and the like.

Hereinafter, in the embodiment of the present disclosure, the VR content rendering device 100 rendering game content in the VR space will be described, but the present disclosure is not limited to game contents but various contents can be applied to the VR content rendering device 100.

The processor 110 senses that at least one user wearing the VR machine 30 enters the VR space (S110).

The at least one user can wear the VR machine 30, and enter the VR space by accessing to the VR content rendering server.

The VR content rendering device 100 can ask the at least one user who accesses to select whether to create a new VR space or whether to enter a VR space which the user's friend or acquaintance created.

As an embodiment, the VR content rendering device 100 can request a password when a user requests entrance to another user's VR space.

The processor 110 renders the avatar of each user in the VR space so that the user can control the avatar using the VR machine 30 (S130).

The processor 110 renders game content selected by the user in a specific position in the VR space (S150).

The processor 110 provides a VR image so that the user can play the game in the VR space using the avatar (S170).

Referring to FIG. 3, it is illustrated that the VR content rendering device 100 renders three avatars in the VR space, and in FIG. 3, three different users enter the VR space.

The VR content rendering device 100 can ask the user to input user information containing the user's age and hobby, kinds of preferred games, kinds of preferred media contents, for instance, movies, animations, and the likes, and the processor 110 can analyze the user information and create and recommend an avatar matching the user.

In an embodiment, the VR content rendering device 100 can ask the user to select one among one or more user avatars stored in the database 130 or to create a new avatar.

The user may create a new avatar according to the user's taste or may edit and customize an avatar recommended by the VR content rendering device 100.

The VR content rendering device 100 provides an effect like the user actually plays game content together with the avatar while viewing the user's own avatar since rendering each avatar in the VR space and plays or uses game content using the avatar. Therefore, the avatar serves as a means to express the user.

The user inputs various control signals using the VR machine 30 in order to control the user's own avatar rendered in the VR space.

Furthermore, referring to FIG. 3, it is illustrated that the avatar 50 wears the VR machine 30 on the head. So, it provides an effect like many friends play a game in one space wearing the VR machines 30.

In an embodiment, the VR content rendering device 100 recognizes a model name of the VR machine 30 which the user wears actually, loads an image of the VR machine 30 of the corresponding model, and renders the loaded image to the avatar in order to increase reality.

In an embodiment, the processor 110 renders game content 71 selected by the user in a specific position in the VR space, and provides, outputs and controls a VR image to the user's VR machine 30 so that the user can play the game 71.

In this instance, the processor 110 determines a rendering position in the VR space of the game content 71 based on the structure and background of the VR space and the position of at least one avatar existing in the VR space, and renders the game content 71 at the determined position.

The processor 110 can render the VR image and provide the VR image to the VR machine 30 so that the game content in the VR image output to the VR machine 30 is viewed from a bird's eye view perspective.

However, the present disclosure is not fixed to the bird's eye view perspective, and the processor 110 can provide various perspectives.

In an embodiment, the processor 110 can render such that the game content in the VR image output to the VR machine 30 is output at an angle that the avatar in the VR space views the game content.

Therefore, the user can control the avatar to control the point of view to view the game content, and can feel reality that the point of view is reflected to the VR image.

In detail, FIG. 3 illustrates that a state in which three users enter the VR space and three avatars are rendered in the VR space is viewed from three perspectives, and actually, the VR image corresponding to the avatars' perspectives is output to the VR machine.

As illustrated in FIG. 3, the VR content rendering device 100 allows a plurality of users to enter the VR space, and renders game content selected by a specific user.

Therefore, not only the user who selected the game content but also other users in the VR space can play the corresponding game content together using their own avatars.

Moreover, the users can play the game together or can select a watching mode.

In this instance, in the case that a plurality of users play the game together, the processor 110 can render and provide VR images by each user such that perspectives of rendered contents shown through the avatar of each user are viewed according to perspective settings of each user.

However, the present disclosure is not limited thereto, and the processor 110 can basically render the VR image in consideration of an angle that the avatar of each user views the game content in the VR space, and provide the VR image to the VR machine 30 of each user.

In an embodiment, the database 130 stores an image of a game control means specific to at least one game content.

For instance, the game control means may be a game controller including a joystick and buttons, a game controller including a steering wheel for racing games, or a game controller including a racket for a tennis game.

The processor 110 loads an image of the game control means specific to the game content selected by the user, and renders a state in which the avatar controls the loaded game control means to the VR space.

Additionally, the processor 110 can render the avatar's control motions according to control signals corresponding to commands input by the user through the VR machine 30.

In detail, the processor 110 can render the avatar's motions to control the game control means according to the control signals input to the VR machine 30 by the user.

For instance, when the user selects a tennis game content, the VR image is rendered like the avatar uses a tennis racket. When the user inputs a control signal to swing a racket to the VR machine 30, a VR image that the avatar swings the tennis racket corresponding to the control signal is rendered.

Technical Features to Determine Rendering Position of Game Content

Referring to FIG. 3, it is illustrated that a rendering space 70 is rendered in front of avatars 50, game content 71 is rendered in the rendering space 70, and characters 75 played by users are rendered in the game content 71.

As described above, the processor 110 determines the rendering position in the VR space of the game content 71 based on the structure and background of the VR space and the position of the avatars 50 existing in the VR space.

Referring to FIG. 3, the processor 110 renders at least one rendering space 70 to render the game content 71 at the determined rendering position.

In this instance, the rendering space 70 means a space or an area of a predetermined size to render the game content 71 in the VR space.

In an embodiment, as illustrated in FIG. 3, the processor 110 can render the rendering space 70 like a virtual table.

As described above, the processor 110 can render the rendering space 70 having specific shape and size in order to render the game content 71.

In addition, the processor 110 renders the game content in at least a part/area of the rendered rendering space 70.

In an embodiment, the processor 110 can determine a size and a rendering position of the rendering space 70 in the VR space, on the basis of the number of the at least one user entering the VR space and the number of game contents 71 selected by the users entering the VR space.

For instance, if more users enter the VR space, the processor 110 can set the rendering space 70 to be wider.

For example, the processor 110 can set the rendering space 70 to be wider if the game content 71 selected by the user is a game to indicate a wide area in a game.

The processor 110 can determine a shape of the rendering space 70 to render the selected game content, on the basis of game environment information of the game content selected by the user.

In this instance, the game environment information may mean a map of the game content.

In an embodiment, the processor 110 can render the game content in at least a part/area of the rendering space 70, and can process awkwardness of a cross section cut off from a boundary surface of the content rendering space if the game content is game content having a seamless world.

The processor 110 can render the background image selected by the user, entering the VR space, as the background for the VR space.

However, the present disclosure is not limited thereto, the processor 110 can render the background image in the VR space when receiving a request for rendering a background image from the user, and does not render the background if the user does not want to render the background image.

In an embodiment, the processor 110 loads a background image for rendering the background of the VR space, on the basis of at least one among an age, a hobby, at least one preferred media content, for instance, a movie, an animation, and the like, and game content selected by each user, and a preferred place of each user entering the VR space.

Moreover, the processor 110 renders the loaded background image as the background of the VR space.

FIG. 4 illustrates that the Eiffel Tower in Paris is rendered as a background image of the VR space.

The processor 110 can select such a background image and render the background image to the VR space if the game selected and played by the user is set in France as a background or if users prefer movies set in France.

FIG. 5 illustrates that a Pororo image is rendered as a background image of the VR space.

The processor 110 can select such a background image and render the background image to the VR space if users are in a low age range, for instance, children, or if users select Pororo as a preferred animation.

FIG. 6 illustrates that the Status of Liberty or a work of art is rendered as a background image of the VR space.

The processor 110 can select such a background image and render the background image to the VR space if users prefer New York or media content, such as a work of art.

In an embodiment, the processor 110 can collect state information of the character 75 in the game content selected by the user entering the VR space in real time.

Furthermore, if the processor 110 detects a change above a reference value from the state information, based on the detection result, the processor 110 can render special effects matching the detection result in at least a part of an area in the VR space.

In this instance, the state information may be any information related to the character's conditions, activities and the like, and may be varied according to kinds of game contents.

For instance, in the case of an RPG game content, the state information of the character 75 may be the character's physical strength, survival, level, and the like.

For instance, in the case of sports game content, the state information of the character 75 may be the character's physical strength, damage, score, and the like.

As described above, if singularity in the state information of the character 75 in the game content that the user is playing is detected, the VR content rendering device 100 can provide special effects matching the detection results in the VR space, so that the users entering the VR space can appreciate the special effects using their own avatars.

In an embodiment, the processor 110 supports such that a first user can view second game content 72 while playing first game content 71.

In the situation in which the first user participates in a plurality of the game contents, if the first game content is a turn-based game and a first avatar's perspective at the first user's turn is in the direction of the second game content, the processor 110 performs conditions set by the first user.

In this instance, the conditions include a first condition to forcibly convert the first avatar's perspective to the first game content, a second condition to convert a turn alarm object to the second game content, and a third condition to provide a sound alarm to the VR machine 30 which the first user is wearing.

If the first user sets the first condition, the processor 110 forcibly converts the first avatar's perspective directing another game content, for instance, the second game content, to the first game content.

Therefore, the VR image in the VR machine 30 of the first user is converted from the second game content to the first game content in a moment.

Therefore, the first user can play a plurality of different game contents on VR at the same time.

Referring to FIG. 7, the VR content rendering device 100 can render and provide the plurality of different game contents in the VR space.

In detail, if the user selects the plurality of different game contents, the processor 110 can partition an area on the rendered rendering space 70 and render each of the selected game contents in each partitioned area.

Therefore, the VR content rendering device 100 can provide a plurality of different game contents on one VR space.

In an embodiment, when a plurality of users enter the VR space and another user (second user) selects game content (second game content) 72 different from the game content (first game content) 71 selected by the first user, the processor 110 partitions an area on the rendered rendering space 70 and respectively renders the first game content 71 and the second game content 72 in the partitioned areas.

Therefore, the plurality of users entering the VR space provided by the VR content rendering device 100 can select and play different game contents, and can watch or play a game that another user is playing.

In an embodiment, when an environment setting function of the game content is performed by the user's VR machine 30, as illustrated by the left avatar of FIG. 3, an UI for environment setting is rendered at the upper part of the corresponding game content, and the user controls the user's own avatar to perform the environment setting of the game content.

Therefore, the present disclosure can support such that the user can perform various settings of the game content in the VR space.

According to the present disclosure, the VR content rendering device providing bird's eye view perspectives can be provided.

Additionally, the present disclosure can provide a VR content of a 3D VR hologram type.

In addition, according to the present disclosure, the user can play a game while watching the game content from various perspectives as well as the bird's eye view in the user's perspective by rendering the user's avatar and the game content selected by the user in the VR space and providing the VR image like the avatar plays the game content.

Moreover, the present disclosure can provide the feeling of reality like the user plays a game together with many people at one place since a plurality of users can enter the VR space and can play a game together using their own avatars.

Furthermore, the present disclosure can minimize position movement of users using VR games so as to remarkably reduce a 3D motion sickness symptom and make content control and character control easier since rendering various game contents in the rendering space in the VR space and providing the VR image.

Additionally, the present disclosure can resolve a spatial limitation of AR and secure variety of contents capable of experiencing in the VR space since not making game content or a 3D content as surrounding environment in the VR space but rendering game content or a 3D content like a user views the game content or the 3D content in the VR space like an AR game.

According to an embodiment of the present disclosure, the method for providing content using communication with animals can be implemented as a program (or application) to be executed by being combined with a computer, which is hardware, and can be stored in a medium included in the content providing system.

The program may include code coded as a computer language, such as C, C++, Java, machine language, etc. which a processor (CPU) of the computer can read through a device interface of a computer. The code may include a functional code associated with a function that defines necessary functions for executing the methods, and may include an execution procedure-related control code in which the processor of the computer needs to execute the functions according to predetermined procedures. In addition, the code may further include additional information necessary for the processor of the computer to execute the functions or memory reference-related code for whether the media should be referenced in which location (address) of the internal or external memory of the computer. Moreover, if communication with any other computer or server in a remote location is required to execute the functions by the process of the computer, the code may further include communication-related code for how to communicate with any other computer or server at a remote location using the communication module of the computer, or whether or not any information or media should be transmitted and received in the communication.

The medium to be stored refers not to a medium storing data for a short time but to a medium that stores data semi-permanently, like a register, cache, memory, and the like, and means a medium readable by a device. In detail, as examples of the medium to be stored, there are read-only memories (ROMs), random access memories (RAMs), CD-ROMs, magnetic tapes, floppy disks, optical data storage devices, and the likes, but the present disclosure is not limited thereto. That is, the program can be stored in various recording media on a variety of servers that can be accessed by a computer or various recording media on the user's computer. Furthermore, the media can store code that is distributed to a computer system connected to the network and that is readable by the computer in a distributed fashion.

The method or algorithm steps described in relation to the embodiments of the present disclosure can be directly embodied in hardware, can be embodied in a software module executed by hardware, or can be embodied by combination thereof. The software module can reside in a random access memory (RAM), a read-only memory (ROM), an erasable programmable read-only memory (EPROM), an electrically erasable programmable read-only memory (EEPROM), a flash memory, a hard disk, a detachable disk, a CD-ROM, or a medium readable by a computer, well-known in the technical field to which the present disclosure belongs.

The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

The invention claimed is:

1. A virtual reality (VR) content rendering device comprising:
   a database storing at least one avatar image and at least one background image to be output to a VR space;
   a communication unit communicating with a VR machine which at least one user wears; and
   a processor rendering the at least one user's avatar in the VR space so that the at least one user can control the avatar through the VR machine when the at least one user wearing the VR machine enters the VR space, renders game content selected by the at least one user in a specific position in the VR space and controls a VR image to be output to the VR machine, so that the at least one user can play the game through the avatar,
   wherein the processor, based on a structure and a background of the VR space and a position of the avatar, determines the specific position in which the game content is rendered in the VR space, and renders the game content in the VR image so as to be output at an angle at which the avatar views the game content,
   wherein when a plurality of users play the game together, the processor renders the VR image by the plurality of users so that perspectives of the game content viewed through the at least one user's avatar are viewed according to the at least one user's perspective settings, and wherein the processor renders at least one rendering space for rendering the game content in a specific position, renders the game content in at least a part of an area in the rendering space, partitions the rendering space into a plurality of spaces when a plurality of different game contents are selected by the at least one user, renders the selected different game contents in the plurality of partitioned spaces on a single table, and renders a user interface (UI) for environment setting in front of the at least one user's avatar.

2. The VR content rendering device according to claim 1, wherein the processor determines a size and a rendering position of the rendering space, on the basis of the number of the at least one user entering the VR space and the number of game contents selected by the at least one user entering the VR space, and wherein the processor determines a shape of the rendering space, on the basis of game environment information of the game content selected by the at least one user.

3. The VR content rendering device according to claim 2, wherein the processor renders the background image selected by the at least one user as a background of the VR space when receiving a request for rendering the background image from the at least one user entering the VR space.

4. The VR content rendering device according to claim 3, wherein the processor collects state information of a character in the game content, which is selected by the at least one user entering the VR space, in real time, and wherein if the processor detects a change above a reference value from the state information, based on the detection result, the processor renders special effects matching the detection result in at least a part of an area in the VR space.

5. The VR content rendering device according to claim 1, wherein the plurality of game contents include first game content and second game content, wherein the processor supports such that the at least one user can view the second game content while interacting with the first game content, wherein in the situation in which the at least one user participates in the first game content and the second game content at the same time, if the first game content is a turn-based game and the avatar's perspective at the at least one user's turn is in the direction of the second game content, the processor performs conditions set by the first user, and wherein the conditions include a first condition to forcibly convert the avatar's perspective to the first game content, a second condition to convert a turn alarm object to the second game content, and a third condition to provide a sound alarm to the VR machine.

6. The VR content rendering device according to claim 5, wherein the database stores an image of a game control means specific to at least one game content, and wherein the processor loads an image of the game control means, specific to the game content selected by the at least one user, from the database, wherein the processor renders a state in which the avatar controls the loaded game control means to the VR space, and wherein the processor renders the avatar's control motions according to commands input by the at least one user through the VR machine.

7. The VR content rendering device according to claim 1, when a tennis game content is selected by the at least one user, the processor renders the VR image that the avatar uses a tennis racket, and when a control signal to swing the tennis racket is inputted from the at least one user to the VR machine, the processor renders the VR image that the avatar swings the tennis racket corresponding to the control signal.

8. A virtual reality (VR) content rendering method carried out by a VR content rendering device, the VR content rendering method comprising the operations of:

rendering an avatar in a VR space so that a user can control the at least one user's avatar through a VR machine when at least one user wearing the VR machine enters the VR space;

rendering game content selected by the at least one user in a specific position in the VR space; and outputting a VR image to the VR machine so that the at least one user can play the game through the avatar, wherein the specific position is determined on the basis of structure and background of the VR space, and a position of the avatar, wherein the game content is rendered to be output at an angle that the avatar views the game content, wherein in the case that a plurality of users play the game together, the VR image is rendered by the plurality of users such that perspectives of the game content shown through the avatar of each user are viewed according to the at least one user's perspective settings, wherein in the specific position, at least one rendering space for rendering the game content is rendered, wherein in at least a part of an area in the rendering space, the game content is rendered, wherein the rendering space is partitioned into a plurality of spaces if a plurality of different game contents are selected by the at least one user, wherein the plurality of selected game contents are respectively rendered in the plurality of partitioned spaces on a single table, and wherein a user interface (UI) for environment setting is rendered in front of the at least one user's avatar.

9. The VR content rendering method according to claim 8, wherein a size and a rendering position of the rendering space are determined on the basis of the number of the at least one user entering the VR space and the number of game contents selected by the at least one user entering the VR space, and wherein a shape of the rendering space is determined on the basis of game environment information of the game content selected by the at least one user.

10. The VR content rendering method according to claim 9, wherein the processor renders the background image selected by the at least one user as a background of the VR space when receiving a request for rendering the background image from the at least one user entering the VR space.

11. The VR content rendering method according to claim 10, wherein state information of a character in the game content, selected by the at least one user entering the VR space, is collected in real time, and wherein if the processor detects a change above a reference value from the state information, based on the detection result, special effects matching the detection result are rendered in at least a part of an area in the VR space.

12. The VR content rendering method according to claim 8, wherein the plurality of game contents include first game content and second game content, wherein the at least one user can view the second game content simultaneously while interacting with the first game content, wherein in the situation in which the at least one user participates in the first game content and the second game content at the same time, if the first game content is a turn-based game and the avatar's perspective at the at least one user's turn is in the direction of the second game content, the processor performs conditions set by the first user, and wherein the conditions include a first condition to forcibly convert the avatar's perspective to the first game content, a second condition to convert a turn alarm object to the second game content, and a third condition to provide a sound alarm to the VR machine.

13. The VR content rendering method according to claim 12, wherein an image of a game control means specific to at least one game content is stored in a database, wherein if the image of the game control means is selected, a state in which the avatar controls the game control means is rendered in the VR space, and wherein the avatar's control motions are rendered according to commands input by the at least one user through the VR machine.

14. The VR content rendering method according to claim 8, when a tennis game content is selected by the at least one user, the VR image that the avatar uses a tennis racket is rendered, and when a control signal to swing the tennis racket is inputted from the at least one user to the VR machine, the VR image that the avatar swings the tennis racket corresponding to the control signal is rendered.

* * * * *